US009646056B1

(12) United States Patent
Phillips et al.

(10) Patent No.: US 9,646,056 B1
(45) Date of Patent: May 9, 2017

(54) RANK-ORDERING AND COGNITIVE SALIENCY SCHEMA-BASED SELECTION

(71) Applicant: HRL Laboratories, LLC, Malibu, CA (US)

(72) Inventors: Matthew E. Phillips, Calabasas, CA (US); Matthias Ziegler, Agoura Hills, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 475 days.

(21) Appl. No.: 14/334,637

(22) Filed: Jul. 17, 2014

Related U.S. Application Data

(60) Provisional application No. 61/861,338, filed on Aug. 1, 2013.

(51) Int. Cl.
G06F 17/30 (2006.01)
(52) U.S. Cl.
CPC .................. G06F 17/3053 (2013.01)
(58) Field of Classification Search
None
See application file for complete search history.

(56) References Cited

U.S. PATENT DOCUMENTS

| | | | | |
|---|---|---|---|---|
| 8,165,407 B1 * | 4/2012 | Khosla | ................. | G06K 9/3241 382/164 |
| 2007/0019865 A1 * | 1/2007 | Owechko | ........... | G06K 9/00369 382/224 |
| 2013/0124076 A1 * | 5/2013 | Bruni | .................... | G08G 5/0095 701/120 |

OTHER PUBLICATIONS

Knudsen 2007. "Fundamental Components of Attention". Annual Review of Neuroscience 30 (1): 57-78.

Phillips, M. E., Avery, M. C., Krichmar, J. L., & Bhattacharyya, R. Top-Down Executive Control Drives Reticular-Thalamic Inhibition and Relays Cortical Information in a Large-Scale Neurocognitive Model In FLAIRS Conference, May 2013.

Chelian, S.E., Oros, N., Zaidivar, A., Krichmar, J., and Bhattacharyya, R. Model of the interactions between neuromodulators and prefrontal cortex during a resource allocation task. In Proceedings of the IEEE International Conference on Development and Learning and Epigenetic Robotics (IEEE ICDL-EpiRob 2012), San Diego, USA, Nov. 2012.

(Continued)

Primary Examiner — Anh Tai Tran
(74) Attorney, Agent, or Firm — Tope-McKay & Associates

(57) ABSTRACT

Described is a system for rank-ordered and cognitive saliency schema-based object selection. The system receives a set of unnormalized probabilities corresponding to a set of objects competing for attentional selection in a current environment. Each unnormalized probability in the set of unnormalized probabilities is based on a likelihood estimation of encountering the corresponding object in the current environment. The set of objects is ranked based on a set of cognitive saliency values corresponding to the set of objects to generate a rank-ordered list of cognitive saliency values. The rank-ordered list of cognitive saliency values is analyzed to detect a schema of the current environment by which the set of objects is ranked. The schema is learned and stored along with a reward measure of the schema's utility. A maximum saliency object in the set of objects is selected based on the rank-ordered list of cognitive saliency values.

22 Claims, 8 Drawing Sheets

(56) References Cited

OTHER PUBLICATIONS

Thorpe, S., Delorme, A., & Van Rullen, R (2001). Spike-based strategies for rapid processing. Neural networks, 14 (6-7), 715-725.

Yu, X. J., Xu, X. X., He, S., & He, J. (2009). Change detection by thalamic reticular neurons, Nature neuroscience, 12 (9), 1165-1170.

Tracy Ji, La Q, Osipowicz K. Mamtani A, Schwartz DP, Uzelac G. A test of the role of two prefrontal/ subcortical networks in the "sequencing" of non-motor, visuo-spatial information. Brain Imaging Behav. Sep. 2011;5(3):159-70, doi: 10.1007/s11682-011-9120-9.

Lebiere, C., Pirolli P., Thomson, R., Paik. J., Rutledge-Taylor, M., Staszewski, J., & Anderson, J. R. A functional model or sensemaking in a neurocognitive architecture. Computational intelligence and neuroscience. 2013, 5.

Knudsen 2007, "Fundamental Components of Attenton". Annual Review of Neuroscience 30 (1): 57-78.

Phillips, M. E., Avery, M. C., Krichmar, J. L., & Bhattacharyya, R. Top-Down Executive Control Drives Reticular-Thalamic Inhibition and Relays Cortical Information in a Large-Scale Neurocognitive Model. In FLAIRS Conference, May 2013.

Chelian, S.E., Oros, N., Zaldivar, A., Krichmar, J., and Bhattacharyya, R. Model of the interactions between neuromodulators and prefrontal cortex during a resource allocation task. In Proceedings of the IEEE International Conference on Development and Learning and Epigenetic Robotics (IEEE ICDL-EpiRob 2012), San Diego, USA, Nov. 2012.

O'Reilly, R. C., Munakata, Y., Frank, M. J., Hazy, T. E., and Contributors (2012). Computational Cognitive Neuroscience, Wiki Book, 1st Edition, Chapter 5, grey.colorado.edu/CompCogNeuro/index.php/CCNBook/Main taken on Jul. 1, 2014.

Thorpe, S., Delorme, A., & Van Rullen, R. (2001). Spike-based strategies for rapid processing. Neural networks, 14 (6-7), 715-725.

Zikopoulos, B., & Barbas, H. (2012). Pathways for emotions and attention converge on the thalamic reticular nucleus in primates. The Journal of Neuroscience, 32(15), 5338-5350.

Yu, X. J., Xu, X. X., He, S., & He, J. (2009). Change detection by thalamic reticular neurons. Nature neuroscience, 12 (9), 1165-1170.

Sun, Y., & Wang, H. The parietal cortex in sensemaking: the dissociation of multiple types of spatial information. Computational intelligence and neuroscience, 2013, 1.

Tracy Ji, La Q, Osipowicz K. Mamtani A. Schwartz DP, Uzelac G. A test of the role of two prefrontal/subcortical networks in the "sequencing" of non-motor, visuo-spatial information. Brain Imaging Behav. Sep. 2011; 5(3): 159-70. doi: 10.1007/s11682-011-9120-9.

Bornmann L, Daniel Hd. Committee peer review at an international research foundation: predictive validity and fairness of selection decisions on post-graduate fellowship applications. Research Evaluation (2005) 14(1): 15-20 doi: 10.3152/147154405781776283.

Lebiere, C., Pirolli, P., Thomson, R., Paik, J., Rutledge-Taylor, M., Staszewski, J., & Anderson, J. R. A functional model of sensemaking in a neurocognitive architecture. Computational intelligence and neuroscience, 2013, 5.

* cited by examiner

| Human Subpopulation | Task 2 | Task 3 |
|---|---|---|
| Update 4/4 probabilities | 79% | 63% |
| Update 3/4 probabilities | 19% | 23% |
| Update 2/4 probabilities | 2% | 11% |
| Update 1/4 probabilities | 0% | 3% |

FIG. 6

RANK-ORDERING AND COGNITIVE SALIENCY SCHEMA-BASED SELECTION

GOVERNMENT LICENSE RIGHTS

This invention was made with government support under U.S. Government Contract Number D10PC20021 ICARUS-MINDS. The government has certain rights in the invention.

CROSS-REFERENCE TO RELATED APPLICATIONS

This is a Non-Provisional patent application of U.S. Provisional Application No. 61/861,338, filed in the United States on Aug. 1, 2013, entitled, "Rank-Ordering and Cognitive Saliency Schema-Based Selection."

FIELD OF INVENTION

The present invention relates to a system for rank-ordering and flexibly selecting salient objects and, more particularly, to a system for rank-ordering and flexibly selecting salient objects using relative cognitive-saliency thresholds.

BACKGROUND OF THE INVENTION

Humans are very good at suppressing attentional distracters to focus on the cognitive or perceptually relevant objects in an environment. Psychologically, this is accomplished through schemas, or heuristics, that allow humans to rank and quickly select the most salient objects in an environment without a detailed evaluation of each object individually. These schemas can range from very simple (e.g., winner-take-all behavior) to quite complex (e.g., risk-aversion behavior) as they are learned and refined through experience. Machine perception systems require a full reevaluation of novel object or the same object in a different environment or context.

Traditional saliency-based ranking methods use perceptual features, such as visual pop out and spatial attention, as saliency measures to rank perceptual objects. When a new context or environment is encountered, traditional methods must reassess the salience of each object in the scene.

Rao et al. (U.S. Pat. No. 5,210,799), discloses a system and method for obtaining salient contours from two-dimensional images acquired by a sensor, which processes the two-dimensional images with an edge detector to produce edges from each of the images, link the edges into lists known as contours, compute a saliency value for each of the contours, rank the contours in decreasing order of saliency, and select certain ones of the ranked contours based on the requirements of a particular vision application. Rao's technique is a method for detecting and ranking visually salient objects using the neural mechanism of edge detection and spatial attention. However, such a method does not generalize across perceptual domains (e.g., auditory, somatosensory) or to cognitive domains (e.g., hypothesis generation and likelihood estimation).

More recent work in the scientific literature has focused on simple spike-timing based ranking models of visual saliency for ordering (see the List of Incorporated Cited Literature References, Literature Reference No. 5). As in the Rao et al. method described above, the spike-timing technique applies solely to the visual perceptual domain with the increased neural fidelity of a spiking network.

Thus, a continuing need exists for an approach that learns general saliency schemas and applies these schemas to novel environments or contexts without requiring perceptual features for saliency measures or ranking.

SUMMARY OF THE INVENTION

The present invention relates to a system for rank-ordering and flexibly selecting salient objects and, more particularly, to a system for rank-ordering and flexibly selecting salient objects using relative cognitive-saliency thresholds. The system comprises one or more processors and a memory having instructions such that when the instructions are executed, the one or more processors perform multiple operations. The system receives a set of unnormalized probabilities corresponding to a set of objects competing for attentional selection in a current environment. Each unnormalized probability in the set of unnormalized probabilities is based on a likelihood estimation of encountering the corresponding object in the current environment. The set of objects is ranked based on a set of cognitive saliency values corresponding to the set of objects to generate a rank-ordered list of cognitive saliency values, wherein the set of cognitive saliency values is proportional to the set of unnormalized probabilities. The rank-ordered list of cognitive saliency values is analyzed to detect a schema of the current environment by which the set of objects is ranked. The schema is learned and stored along with a reward measure of the schema's utility. A maximum saliency object in the set of objects is selected based on the rank-ordered list of cognitive saliency values.

In another aspect, the stored schema and the reward measure are recalled when presented with a new environment. A set of processing strategies is appended onto the rank-ordered list of cognitive saliency values based on the recall of the stored schema and the reward measure, thereby generating a processed rank-ordered list of cognitive saliency values.

In another aspect, the processed rank-ordered list of cognitive saliency values is filtered, such that the objects with relatively low cognitive saliency values are filtered out from the processed rank-ordered list of cognitive saliency values, thereby generating a filtered rank-ordered list of cognitive saliency values.

In another aspect, a maximum salient object is selected from the filtered rank-ordered list of cognitive saliency values. The cognitive saliency value corresponding to the maximum salient object is stored to inhibit return to the maximum salient object.

In another aspect, the set of cognitive saliency values is passed through a relative saliency threshold.

In another aspect, the schema is applicable to any type of saliency.

In another aspect, the system models attentional selection and cognitive biases in humans.

In another aspect, the present invention comprises an autonomous robot comprising at least one onboard sensor, the at least one onboard sensor operable for sensing a set of objects in a current environment, and one or more processors and a memory having instructions such that when the instructions are executed, the one or more processors perform multiple operations. The system receives a set of unnormalized probabilities corresponding to a set of objects competing for attentional selection in a current environment. Each unnormalized probability in the set of unnormalized probabilities is based on a likelihood estimation of encountering the corresponding object in the current environment. The set of objects is ranked based on a set of cognitive saliency values corresponding to the set of objects to generate a rank-ordered list of cognitive saliency values, wherein the set of cognitive saliency values is proportional to the set of unnormalized probabilities. The rank-ordered list of cognitive saliency values is analyzed to detect a schema of the current environment by which the set of objects is ranked. The schema is learned and stored along with a reward measure of the schema's utility. A maximum saliency object in the set of objects is selected based on the rank-ordered list of cognitive saliency values.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a table illustrating human behavioral phenotypes for updating a set of options as a function of task according to the principles of the present invention.

DETAILED DESCRIPTION

Figure 1:
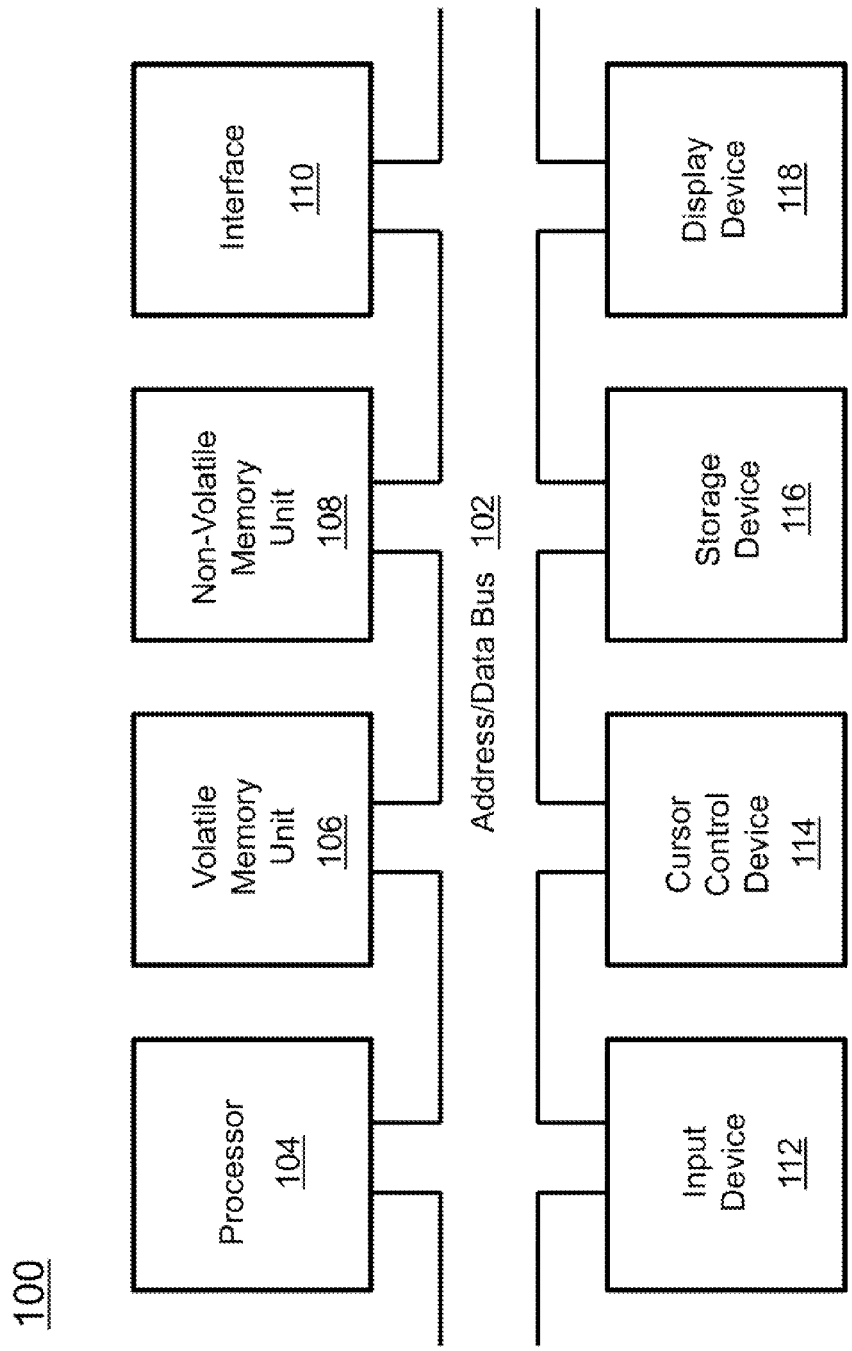
FIG. 1 is a block diagram depicting the components of a system for rank-ordering and flexibly selecting salient objects in an image according to the principles of the present invention.

The present invention relates to a system for rank-ordering and flexibly selecting salient objects and, more particularly, to a system for rank-ordering and flexibly selecting salient object using relative cognitive-saliency thresholds. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader.

The following references are hereby incorporated by reference as though fully included herein. The references are cited in the application by referring to the corresponding literature reference number, as follows:
1. Knudsen 2007. "Fundamental Components of Attention". Annual Review of Neuroscience 30 (1): 57-78.
2. Phillips, M. E., Avery, M. C., Krichmar, J. L., & Bhattacharyya, R. Top-Down Executive Control Drives Reticular-Thalamic Inhibition and Relays Cortical Information in a Large-Scale Neurocognitive Model. In FLAIRS Conference, May, 2013.
3. Chelian, S. E., Oros, N., Zaldivar, A., Krichmar, J., and Bhattacharyya, R. Model of the interactions between neuromodulators and prefrontal cortex during a resource allocation task. In Proceedings of the IEEE International Conference on Development and Learning and Epigenetic Robotics (IEEE ICDL-EpiRob 2012), San Diego, USA, November, 2012.
4. O'Reilly, R. C., Munakata, Y., Frank, M. J., Hazy, T. E., and Contributors (2012). Computational Cognitive Neuroscience. Wiki Book, 1st Edition, Chapter 5, grey.colorado.edu/CompCogNeuro/index.php/CCNBook/Main taken on Jul. 1, 2014.

5. Thorpe, S., Delorme, A., & Van Rullen, R. (2001). Spike-based strategies for rapid processing. Neural networks, 14(6-7), 715-725.
6. Zikopoulos, B., & Barbas, H. (2012). Pathways for emotions and attention converge on the thalamic reticular nucleus in primates. The Journal of Neuroscience, 32(15), 5338-5350.
7. Yu, X. J., Xu, X. X., He, S., & He, J. (2009). Change detection by thalamic reticular neurons. Nature neuroscience, 12(9), 1165-1170.
8. Sun, Y., & Wang, H. The parietal cortex in sensemaking: the dissociation of multiple types of spatial information. Computational intelligence and neuroscience, 2013, 1.
9. Tracy J I, La Q, Osipowicz K, Mamtani A, Schwartz D P, Uzelac G. A test of the role of two prefrontal/subcortical networks in the "sequencing" of non-motor, visuo-spatial information. Brain Imaging Behav. 2011 September; 5(3): 159-70. doi: 10.1007/s11682-011-9120-9.
10. Bornmann L, Daniel H D. Committee peer review at an international research foundation: predictive validity and fairness of selection decisions on post-graduate fellowship applications. Research Evaluation (2005) 14(1): 15-20 doi: 10.3152/147154405781776283 MITRE. IARPA's ICArUS Program: Phase 1 Challenge Problem Design and Test Specification. Oct. 22, 2012.
11. Lebiere, C., Pirolli, P., Thomson, R., Paik, J., Rutledge-Taylor, M., Staszewski, J., & Anderson, J. R. A functional model of sensemaking in a neurocognitive architecture. Computational intelligence and neuroscience, 2013, 5.

(2) Principal Aspects

The present invention has three "principal" aspects. The first is a system for rank-ordering and flexibly selecting salient objects. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or funictions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
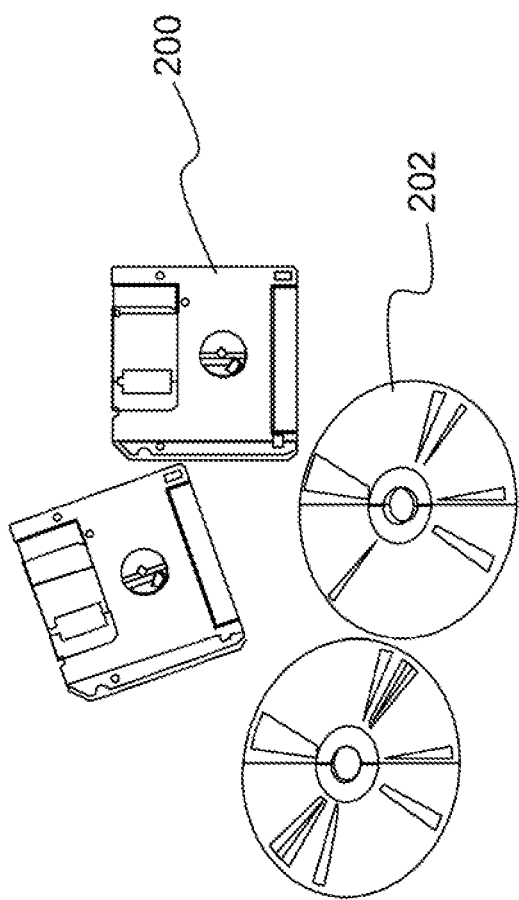
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Described is a system for flexibly ranking objects and selecting from a rank-ordered list through cognitive saliency and learned schemas. The flexibility refers to both a relative cognitive-saliency threshold for the objects as well as the ability to store and recall prior reward-based saliency schemas. The relative cognitive-saliency thresholds allows the method to flexibly and rapidly select the most salient (i.e., most noticeable or important) objects as a function of their saliency relative to all of the other objects in the environment. The schemas by which objects are ranked can be learned, stored, and recalled for later use.

Traditional saliency-based ranking methods use perceptual features, such as visual pop out and spatial attention, as saliency measures to rank perceptual objects. When a new context or environment is encountered, traditional methods must reassess the salience of each object in the scene. The approach according to the principles of the present invention learns general saliency schemas and applies these schemas to novel environments or contexts. The schemas are stored, along with a reward measure of their utility, and recalled later during reward-based decision making. The present invention also utilizes more general cognitive saliency estimates and does not require perceptual features for saliency measures or ranking. Objects with relatively low cognitive saliency are filtered out from the higher levels of decision making by top-down attentional modulation.

Humans are very good at suppressing attentional distracters to focus on the cognitive or perceptually relevant objects in an environment. Psychologically, this is accomplished through schemas, or heuristics, that allow humans to rank and quickly select the most salient objects in an environment without a detailed evaluation of each object individually. These schemas can range from very simple (e.g., winner-take-all behavior) to quite complex (e.g., risk-aversion behavior) as they are learned and refined through experience. Machine perception systems require a full re-evaluation of a novel object or the same object in a different environment or context.

The functions described above allow the system according to the principles of the present invention to accurately and flexibly model the global neglect of low probability objects observed in humans. These features match human's relative neglect of both perceptual and cognitive non-salient objects. In one aspect, reward learning is implemented as declarative memory for the reward of a schema; however, other reward learning systems are possible including, but not limited to, reward learning in the prefrontal cortex and basal ganglia systems. Finally, the inhibition of return mechanism in the present invention serves as a novelty detector, allowing rapid evaluation of contextual or environmental shifts relative to the stored saliency schemas.

Figure 3A:
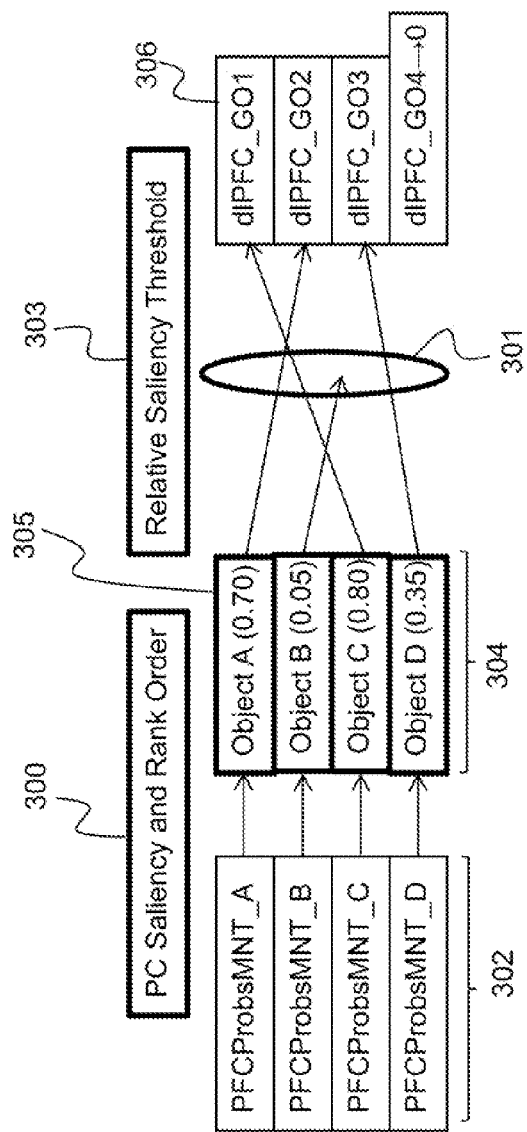
FIG. 3A illustrates rank-ordering according to the principles of the present invention.
Figure 3B:
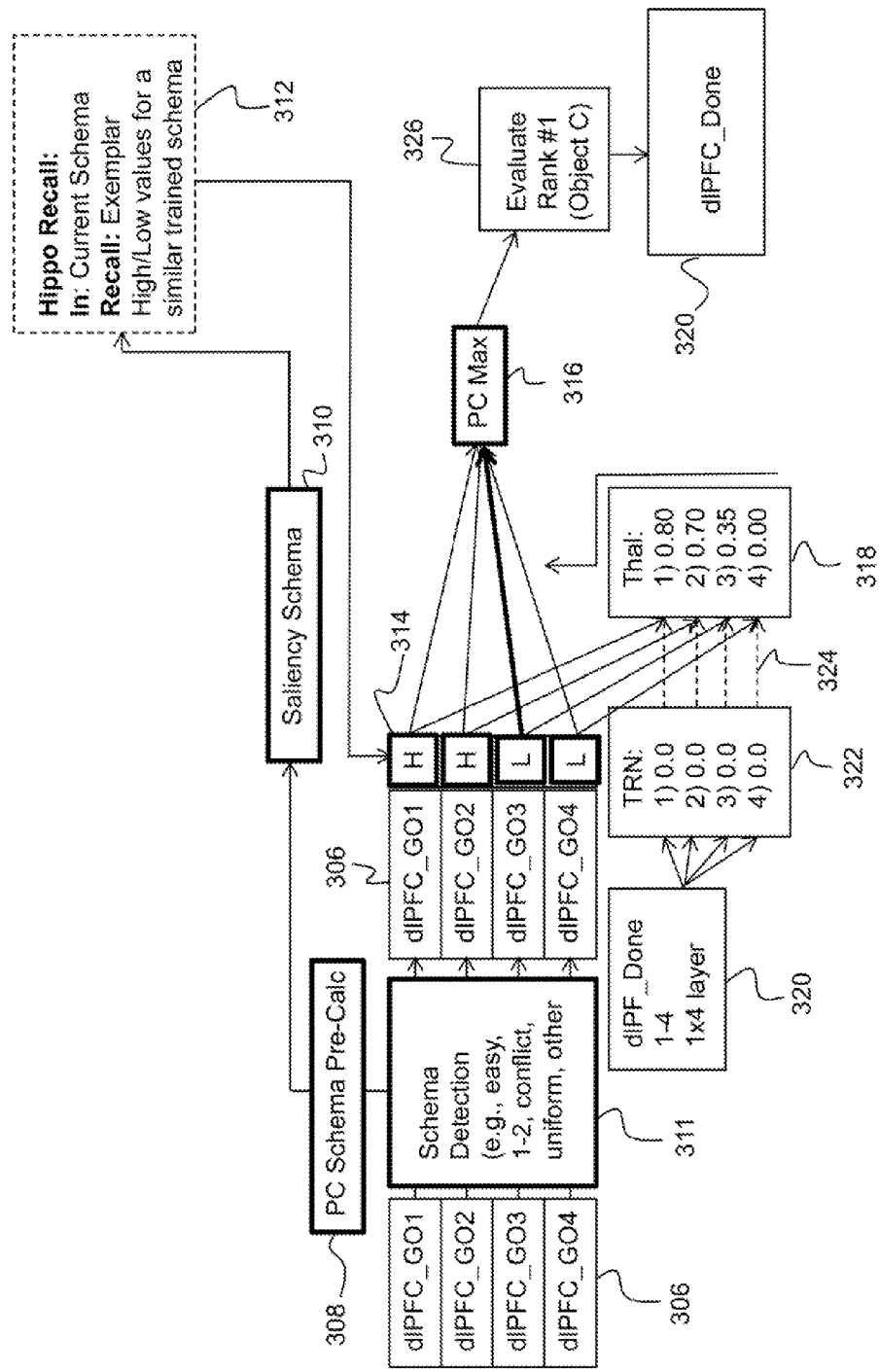
FIG. 3B illustrates saliency processing according to the principles of the present invention.

FIGS. 3A and 3B illustrate the functional architecture of the system according to the principles of the present invention. FIGS. 3A and 3B are part of one continual process to arrive at a ranked list of salient objects with a saliency thresholding process (depicted in FIG. 3A) using a parietal cortex (PC) saliency and rank order module 300 and a relative saliency threshold 303, which occurs before a schema detection and evaluation of the ranked list (depicted in FIG. 3B).

Modules having a bold solid outline represent functions or elements related to the parietal cortex (PC). Modules having an unbolded solid outline represent functions or elements related to the pre-frontal cortex (PFC). Modules having a dashed outline represent functions or elements related to a hippocampus module. In this diagrammed implementation, a set of objects (e.g., four objects labeled A-D) within an environment (e.g., visual image) compete for attentional selection. A neurocognitive circuit (also referred to as the PC saliency and rank order module 300) ranks the cognitive saliency of competing objects based on a likelihood estimation of encountering these objects in the environment. The ranked list is then passed through the relative saliency threshold module 303 to determine the most relevant hypotheses for the model to process. As can be appreciated by one skilled in the art, the system is generalizable to any number of objects, and the four objects used in the example depicted in FIGS. 3A and 3B are only presented as a non-limiting example.

Activities within neural network layers are visually represented as a topographic matrix of activation values. Thus, inputs and outputs can be thought of as two-dimensional patterns of neural activation data. In FIG. 3A, projecting lines with arrows indicate feed-forward and feedback neural connections between layers. Learning occurs at each projection between layers using the Lebra learning algorithm, consisting of a mixture of Hebbian and error-driven learning (see Literature Reference No. 4 for a description of the Lebra learning algorithm).

(3.1) Basic Concept of Operation

The four objects in the implementation depicted in FIG. 3A are maintained and represented in a pre-frontal cortex module as unnormalized probabilities 302 (i.e., PFCprob-MNT) of the objects likelihood of occurrence determined independently for each object in isolation. These unnormalized probabilities 302 can be thought of as the priors in a Bayesian framework, which are updated based on new information the system receives.

The parietal cortex (PC) (modules represented by a bold solid outline in FIGS. 3A and 3B) receives these input values (i.e., unnormalized probabilities 302) and ranks the objects relative to each other based on the saliency values 304 obtained prior to ranking during isolated object examination from the PC. For example, as shown in FIG. 3. Object A 305 has a saliency value of 0.70. The object saliency values 304 are directly proportional to each object's probability, or likelihood of occurrence; however, the present invention is flexible and is not dependent on a fixed definition for evaluating object saliency. Prior probability object saliency values are relayed through neural connections to the PC saliency and rank order module 300.

As shown in FIG. 3A, probability values (i.e., unnormalized probabilities 302) from the PFC (as represented by a solid unbolded outline) are ranked through trained neural-connections in a supplementary motor area (SMA_Rank) module (represented by a circular rank loop 301 in FIG. 3A) and then held in a working memory in a dorsal-lateral PFC (dlPFC_GO) module, generating a rank-ordered list of saliency values 306 prior to their probability updating in the PC, which evaluates and ranks the objects. The synaptic weights of these neural network connections are trained such that in the event of a tie, the alphabetically first group will be processed first, reflecting a common human bias (see Literature Reference No. 10). The PC can then execute probability updates for each object in the order specified in the rank-ordered list of saliency values 306 of the dlPFC module (i.e., dlPFC_GO layer), as needed. The end result of the process shown in FIG. 3A, the rank-ordered list of saliency values 306 (i.e., dlPFC_GO1, dlPFC_GO2, dlP-FC_GO3, and dlPFC_GO4→0), are inputs to the process illustrated in FIG. 3B. dlPFC_GO4→0 indicates a saliency filtering via the relative saliency threshold 300. That is, the saliency value of dlPFC_GO4 was below the threshold and was, therefore, floored to zero.

(3.2) Saliency Schema Operation

The PC module can analyze the rank-ordered list of saliency values 306 in a PC Schema Pre-Calc circuit 308 to determine the current environmental schemas (saliency schemas 310), as illustrated in FIG. 3B. A schema is a label or class for a particular distribution of saliency values. The schema in FIG. 3B does not necessarily use the relative saliency threshold 303 in FIG. 3A, although the schema in FIG. 3B can be used in combination with the relative saliency threshold 303. Based on schema detection 311, the distribution of the rank-ordered list of saliency values 306 prompts different saliency schema 310. Schema detection 311 evaluates the saliency schema 310 from all values (in this case, four). In one aspect, the recall of the saliency schema 310 with prior experience from the hippocampus module 312 then appends PC processing strategies (e.g., H, L representing high (H) or low (L) values for a similar trained schema) 314 onto the rank-ordered list of saliency values 306, as described below.

Figure 4:
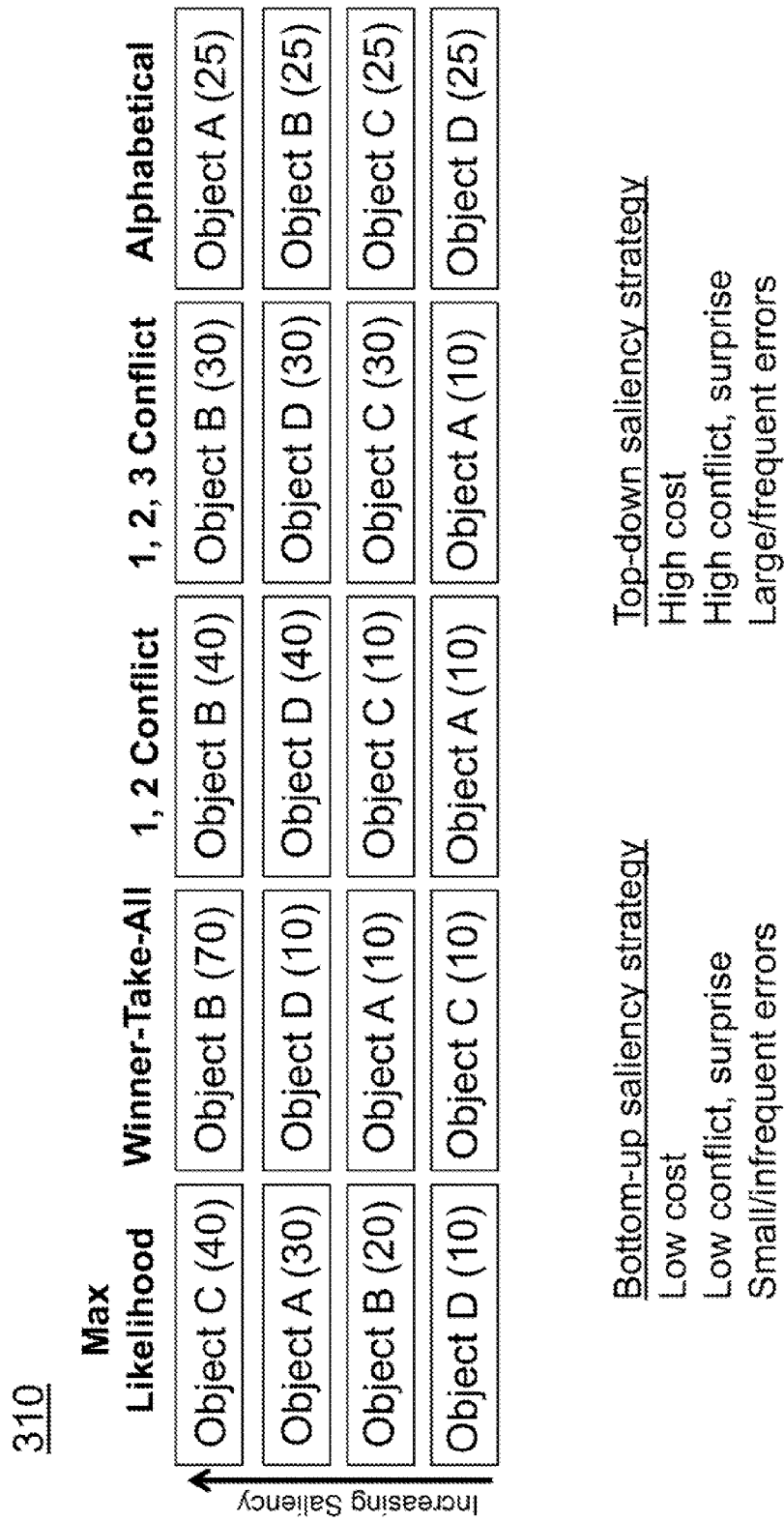
FIG. 4 illustrates example saliency schemas in object ranking according to the principles of the present invention.

Non-limiting examples of the environmental schemas (i.e., saliency schemas 310) within the PC Schema Pre-Calc circuit 308 are depicted in FIG. 4 and described below. In one aspect, and without implying a limitation, the environmental schemas (i.e., saliency schemas 310) are fixed options that the PC Schema Pre-Calc circuit 308 selects from.

In another aspect, the present invention has the ability to generate novel schemas based on the hippocampal module's 312 encoding and storage of a novel distribution of saliency values (i.e., different enough from prior encountered distributions via a novelty threshold or similarity metric (e.g., r-squared metric)) over objects as determined by the experience-dependent utility value of a particular schema (typical for five or more objects). This can be accomplished by reward-driven learning (e.g., the model can learn a winner-take-all schema to maximize payout in an n-arm bandit task). These saliency schemas 310 are then stored in memory through connections with a hippocampus module 312. The hippocampus module 312 then recalls the processing strategy for the PC module (represented by bold solid outlines) based on prior exemplars and the reward-magnitude of these processing schemas.

In FIG. 3B, the PC processing strategies 314 are depicted as Boolean high (H)/low (L) effort computations. High effort computations involve processing all spatial and semantic features for a given option and are computationally expensive. Low effort computations can be either the direct prior probability values themselves or a basic computational update based on one or two spatial or semantic features of a given object. These PC processing strategies 314 are also flexible and adaptive; as the system learns the utility of the saliency schemas, it can modify the PC processing strategies 314 to maximize the potential reward limited by the computational effort required.

The PC processing strategies 314 then project their output to a relay thalamus 318. A copy of the list of rank-ordered saliency values 306 the system has completed processing are stored in a separate dlPFC_Done layer 320. dlPFC_Done is the post-processing value the dlPFC_GO modules are set to during the processing depicted in FIG. 3B. This was implemented in the computational model as a 1×4 layer; however, this is simply a data structure convention and different labels could be used.

These layers (i.e., dlPFC_Done layers 320) project to a thalamic reticular nucleus (TRN) module 322 where the inhibition of return mechanism is engaged. Inhibition occurs between the TRN module 322 and thalamic 318 layers. Inhibitory connections are represented by dashed arrows 324. These connections form the mechanism for the inhibition of return where novel objects in the environment preferentially receive a higher degree of selection bias due to the input from the dlPFC_DONE layer 320 (see Literature Reference No. 6). Novelty is determined by the dlPFC_Done layer 320 projecting the memory of prior updated saliency values to the TRN module 322. These inhibitory projections (as represented by the dashed arrows 324) are activated when objects are sequentially processed. In FIG. 3B, the TRN module 322 is shown unoccupied (as indicated by the 0.0 values) so that the PC max module 316 will attend the highest saliency object. Thus, the dlPFC_GO layers provide a top-down control mechanism via reticular-thalamic inhibition to direct attention to unprocessed and novel objects in the environment.

Outputs from the dlPFC_GO layers (i.e., the list of rank-ordered saliency values 306) are gated by the relay thalamus (i.e., the TRN module 322 and the thalamic layers 318) under top-down control (see Literature Reference No. 2 for a detailed description of the top-down control). The list rank-ordered saliency value 306 that are relayed through the relay thalamus 322 and 318 are passed to another region of the PC, the PC max module 316, where the maximum saliency object is selected amongst the remaining subset of objects in the PC max module 316. The evaluated object's saliency value (i.e., evaluate rank #1 326) is then stored in the dlPFC_Done layer 320 to inhibit the system from returning to that object. Finally, upon completion of evaluating the entire environment's objects, the saliency schema 310 along with the reward value of the saliency schema 310 is stored in the hippocampus module 312. The reward value is computed by a comparison with the ground-truth values. Refer to Literature Reference 3 for an example of an effort/reward tradeoff circuitry.

FIG. 4 illustrates a non-limiting example of saliency schemas 310 in object ranking according to the principles of the present invention. Objects A-D are ranked based on their relative cognitive saliency value (represented as probabilities from 0-100%, normalized across all four objects). As shown, the examples of saliency schemas 310 include maximum likelihood ordering schema, winner-take-all, a schema for a conflict in the 2 highest saliency objects (1, 2 Conflict), the three highest saliency objects (1, 2, 3 conflict), and alphabetical. The system according to the principles of the present invention uses these bottom-up saliency schemas, which have the characteristics of low cost, low conflict and surprise, and small, infrequent errors.

(3.2) Experimental Studies

Human subjects often neglect to update all of the object probabilities in many of the tasks in the ICArUS COIN-AHA challenge problem (see Literature Reference No. 10 for a description of the tasks). For example, in the Task 4 pilot exam 38.6% of object probabilities were unchanged after receiving an intelligence layer (SOCINT). Often these objects represent low probability events with little to no executive relevance or cognitive salience. Neglecting to update each and every object affects all object probabilities, even if the changes are small, due to the automatic normalization by the task graphical user interface (GUI).

One of the goals of the invention described herein is to model this human bias to only update larger probability objects. An analysis on the ICArUS Phase 1 final human data was performed, and the model's relative salience threshold was tuned to match the human behavioral neglect of low probability groups. The analysis focused on identifying conditions and potential behavioral phenotypes (through clustering analysis) under which low probability groups are neglected. The human behavior for 0, 1, and 3 group probability updates were recapitulated by tuning the initial saliency threshold to match the average human behavior.

Figure 5:
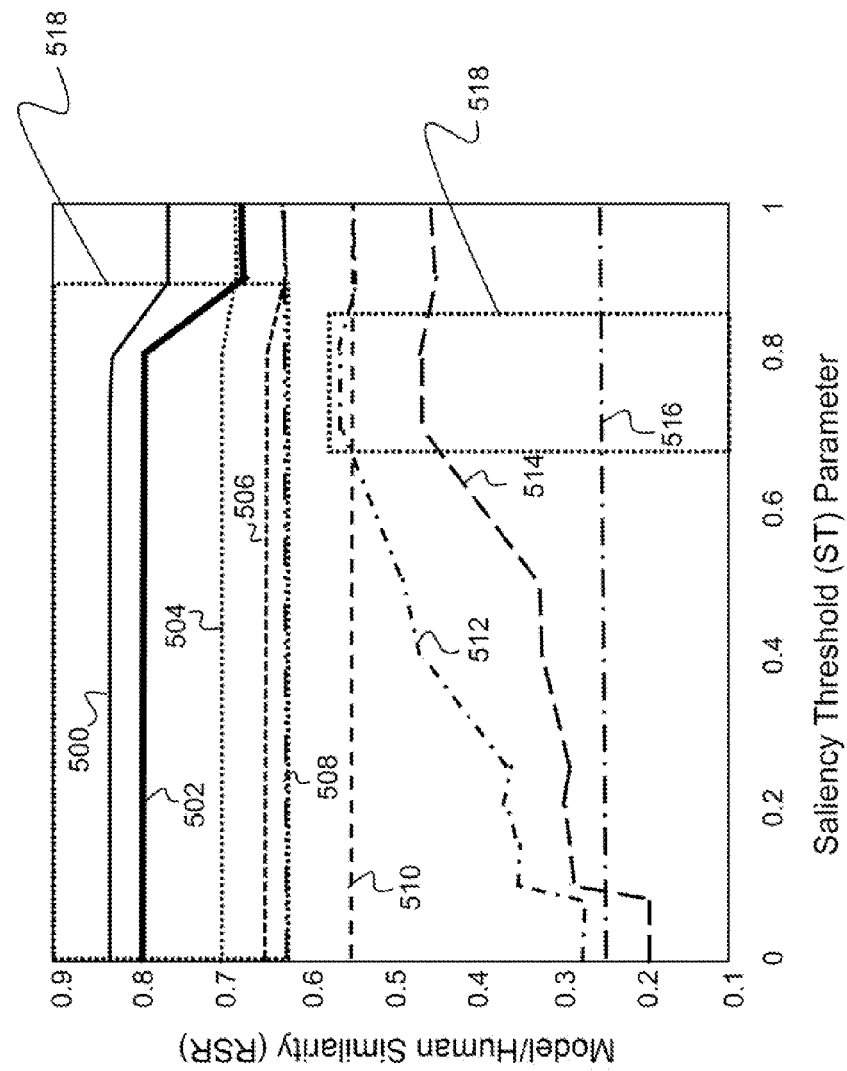
FIG. 5 illustrates results from an experimental study showing the identification of human behavioral phenotypes using the rank-ordering and saliency processing according to the principles of the present invention.

FIG. 5 is a plot of results from an experimental study showing the identification of human behavioral phenotypes using the rank-ordering and saliency processing system according to the principles of the present invention. Specifically, FIG. 5 illustrates the system's performance at matching human behavior in two spatial reasoning tasks as measured by the accuracy of human performance prediction. Along the y-axis is model/human similarity measured by relative success rate (RSR), (as defined in Literature Reference No. 11). Along the x-axis is a saliency threshold (ST) parameter.

For each curve, a relative saliency threshold was on unless otherwise stated. Task 2 was a two-dimensional spatial likelihood estimation task, while Task 3 was a one-dimensional spatial likelihood estimation task (see Literature Reference No. 11). Curve 500 represents Task 3: model vs. the subset of humans who updated two options per block. Curve 502 represents Task 3: model vs. the subset of humans with one update per block. Curve 504 represents Task 3: model vs. the subset of humans with three updates per block. Curve 506 represents Task 3: model vs. all humans. Curve 508 represents Task 3: model vs. all humans without the relative saliency threshold in the model (i.e., all options are updated). Curve 510 represents Task 2: model vs. all humans without the relative saliency threshold in the model. Curve 512 represents Task 2: model vs. all humans. Curve 514 represents Task 2: model vs. the subset of humans with three updates per block. Curve 516 represents Task 2: model vs. the subset of humans with two updates per block. The present invention also identified a human behavioral phenotype that does not consider all four options, but only a subset represented by dashed boxes 518.

FIG. 6 depicts a table illustrating the percent of total human trials exhibiting updating behaviors for the four options as a function of task defining the performance of the inventions in FIG. 5 (the human data is from Literature Reference No. 11). The system according to the principles of the present invention successfully modeled the subpopulations of humans updating 3, 2, or 1 subset of options.

Any system that must select from and devote computational resources to processing a subset of the most relevant objects in an environment can benefit from the present invention. Without attentional saliency, any machine-learning algorithm must adapt to a novel environment or context by re-learning through tuning internal parameters. Because the system according to the present invention learns the relevant schema of each environment it encounters and can recall these schemas in a reward-based manner, it can flexibly utilize the most valuable learned heuristics in novel environments and contexts. In addition, the relative saliency threshold in the system models the trade-off between exogenous attention and the internal costs associated with attentional focus (see Literature Reference No. 1 for a description of the trade-off).

The invention described herein models aspects of human cognition and reproduces human behaviors observed during cognitive decision making. A system, such as the one described herein, that can rapidly rank the relevant objects in a novel environment could be used in lieu of a human observer. For instance, the system could be used as an early warning system to detect, rank, and identify multiple targets in order of threat level. Such a system could also be used for rapid saliency-based filtering of target objects in conjunction with existing threat-detection systems. This can be used for autonomous systems, such as autonomous robots, and systems that would augment human performance (e.g., operator adaptive, personalization, optimization, and learning systems). Additionally, since the method is based on the mechanism of attentional saliency and reward-based decision-making, it could also be used as a tool to predict, or as an autonomous system to reproduce, a wide range of human behaviors and decisions based on environment and prior experience (e.g., in enemy strategy prediction, decision-making in marketing applications). Furthermore, since this method captures the neural mechanisms of ranking and saliency schemas in humans, it could also be used to predict and understand the source of cognitive biases in humans during ranking and saliency judgments (e.g., difference in decision making in experts vs. novices, modeling applications for mitigating human fatigue).

Figure 7:
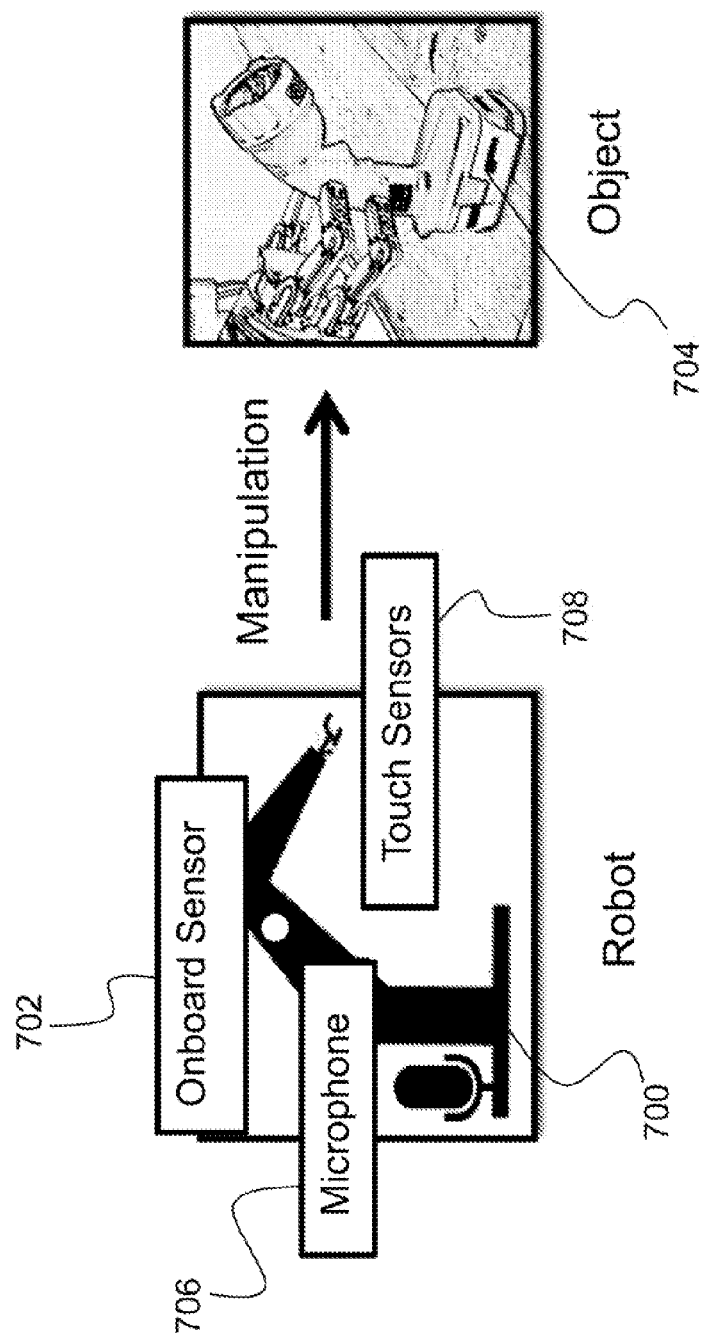
FIG. 7 is an illustration of an autonomous robot according to the principles of the present invention.

FIG. 7 is an illustration of an autonomous robot 700 incorporating capabilities according to the principles of the present invention in a processor 100. The autonomous robot 700 comprises an at least one onboard sensor 702, wherein the at least one onboard sensor 702 is operable for sensing a set of objects 704 in a current environment. Non-limiting examples of the at least one onboard sensor 702 may include a camera, a video camera, a thermal imaging sensor, and an infrared sensor. Furthermore, the autonomous robot 700 may include additional sensors including, but not limited to, a microphone 706 and touch sensors 708. Additionally, the autonomous robot 700 may comprise a plurality of actuators (e.g., motors, tactile actuators) for selecting a salient object 704 in the current environment, such as for manipulation.

What is claimed is:

1. A system for rank-ordering and cognitive saliency schema-based selection, the system comprising:
   one or more processors and a non-transitory computer-readable medium having executable instructions encoded thereon such that when executed, the one or more processors perform operations of:
   receiving a set of unnormalized probabilities corresponding to a set of objects competing for attentional selection in a current environment, wherein each unnormalized probability in the set of unnormalized probabilities is based on a likelihood estimation of encountering the corresponding object in the current environment;
   ranking the set of objects based on a set of cognitive saliency values corresponding to the set of objects to generate a rank-ordered list of cognitive saliency values, wherein the set of cognitive saliency values is proportional to the set of unnormalized probabilities;
   analyzing the rank-ordered list of cognitive saliency values to detect a schema of the current environment by which the set of objects is ranked;
   learning and storing the schema along with a reward measure of the schema's utility; and
   selecting a maximum saliency object in the set of objects based on the rank-ordered list of cognitive saliency values.

2. The system as set forth in claim 1, wherein the one or more processors further perform operations of:
   recalling the stored schema and the reward measure when presented with a new environment; and
   appending a set of processing strategies onto the rank-ordered list of cognitive saliency values based on the recall of the stored schema and the reward measure, thereby generating a processed rank-ordered list of cognitive saliency values.

3. The system as set forth in claim 2, wherein the one or more processors further perform an operation of filtering the processed rank-ordered list of cognitive saliency values, such that the objects with relatively low cognitive saliency values are filtered out from the processed rank-ordered list of cognitive saliency values, thereby generating a filtered rank-ordered list of cognitive saliency values.

4. The system as set forth in claim 3, wherein the one or more processors perform operations of:
   selecting a maximum salient object from the filtered rank-ordered list of cognitive saliency values; and
   storing the cognitive saliency value corresponding to the maximum salient object to inhibit return to the maximum salient object.

5. The system as set forth in claim 4, wherein the one or more processors further perform an operation of passing the set of cognitive saliency values through a relative saliency threshold.

6. The system as set forth in claim 5, wherein the schema is applicable to any type of saliency.

7. The system as set forth in claim 1, wherein the one or more processors further perform an operation of modeling attentional selection and cognitive biases in humans.

8. A computer-implemented method for rank-ordering and cognitive saliency schema-based selection, comprising:
   an act of causing a data processor to execute instructions stored on a non-transitory memory such that upon execution, one or more processors perform operations of:
   receiving a set of unnormalized probabilities corresponding to a set of objects competing for attentional selection in a current environment, wherein each unnormalized probability in the set of unnormalized probabilities is based on a likelihood estimation of encountering the corresponding object in the current environment;
   ranking the set of objects based on a set of cognitive saliency values corresponding to the set of objects to generate a rank-ordered list of cognitive saliency values, wherein the set of cognitive saliency values is proportional to the set of unnormalized probabilities;
   analyzing the rank-ordered list of cognitive saliency values to detect a schema of the current environment by which the set of objects is ranked;
   learning and storing the schema along with a reward measure of the schema's utility; and
   selecting a maximum saliency object in the set of objects based on the rank-ordered list of cognitive saliency values.

9. The method as set forth in claim 8, wherein the one or more processors perform operations of:
   recalling the stored schema and the reward measure when presented with a new environment; and
   appending a set of processing strategies onto the rank-ordered list of cognitive saliency values based on the recall of the stored schema and the reward measure, thereby generating a processed rank-ordered list of cognitive saliency values.

10. The method as set forth in claim 9, wherein the one or more processors further perform an operation of filtering the processed rank-ordered list of cognitive saliency values, such that the objects with relatively low cognitive saliency values are filtered out from the processed rank-ordered list of cognitive saliency values, thereby generating a filtered rank-ordered list of cognitive saliency values.

11. The method as set forth in claim 10, wherein the one or more processors further perform operations of:
   selecting a maximum salient object from the filtered rank-ordered list of cognitive saliency values; and
   storing the cognitive saliency value corresponding to the maximum salient object to inhibit return to the maximum salient object.

12. The method as set forth in claim 11, wherein the one or more processors further perform an operation of passing the set of cognitive saliency values through a relative saliency threshold.

13. The method as set forth in claim 12, wherein the schema is applicable to any type of saliency.

14. The system as set forth in claim 8, wherein the one or more processors further perform an operation of modeling attentional selection and cognitive biases in humans.

15. A computer program product for rank-ordering and cognitive saliency schema-based selection, the computer program product comprising computer-readable instructions stored on a non-transitory computer-readable medium that are executable by a computer having a processor for causing the processor to perform operations of:
- receiving a set of unnormalized probabilities corresponding to a set of objects competing for attentional selection in a current environment, wherein each unnormalized probability in the set of unnormalized probabilities is based on a likelihood estimation of encountering the corresponding object in the current environment;
- ranking the set of objects based on a set of cognitive saliency values corresponding to the set of objects to generate a rank-ordered list of cognitive saliency values, wherein the set of cognitive saliency values is proportional to the set of unnormalized probabilities;
- analyzing the rank-ordered list of cognitive saliency values to detect a schema of the current environment by which the set of objects is ranked;
- learning and storing the schema along with a reward measure of the schema's utility; and
- selecting a maximum saliency object in the set of objects based on the rank-ordered list of cognitive saliency values.

16. The computer program product as set forth in claim 15, further comprising instructions for causing the processor to perform operations of:
- recalling the stored schema and the reward measure when presented with a new environment; and
- appending a set of processing strategies onto the rank-ordered list of cognitive saliency values based on the recall of the stored schema and the reward measure, thereby generating a processed rank-ordered list of cognitive saliency values.

17. The computer program product as set forth in claim 16, further comprising instructions for causing the processor to perform an operation of filtering the processed rank-ordered list of cognitive saliency values, such that the objects with relatively low cognitive saliency values are filtered out from the processed rank-ordered list of cognitive saliency values, thereby generating a filtered rank-ordered list of cognitive saliency values.

18. The computer program product as set forth in claim 17, further comprising instructions for causing the processor to perform operations of:
- selecting a maximum salient object from the filtered rank-ordered list of cognitive saliency values; and
- storing the cognitive saliency value corresponding to the maximum salient object to inhibit return to the maximum salient object.

19. The computer program product as set forth in claim 18, further comprising instructions for causing the processor to perform an operation of passing the set of cognitive saliency values through a relative saliency threshold.

20. The computer program product as set forth in claim 19, wherein the schema is applicable to any type of saliency.

21. The computer program product as set forth in claim 15, further comprising instructions for causing the processor to perform an operation of modeling attentional selection and cognitive biases in humans.

22. An autonomous robot for rank-ordering and cognitive saliency schema-based selection, the system comprising:
- at least one onboard sensor, the at least one onboard sensor operable for sensing a set of objects in a current environment; and
- one or more processors and a non-transitory memory having instructions encoded thereon such that when the instructions are executed, the one or more processors perform operations of:
- receiving a set of unnormalized probabilities corresponding to the set of objects competing for attentional selection in a current environment, wherein each unnormalized probability in the set of unnormalized probabilities is based on a likelihood estimation of encountering the corresponding object in the current environment;
- ranking the set of objects based on a set of cognitive saliency values corresponding to the set of objects to generate a rank-ordered list of cognitive saliency values, wherein the set of cognitive saliency values is proportional to the set of unnormalized probabilities;
- analyzing the rank-ordered list of cognitive saliency values to detect a schema of the current environment by which the set of objects is ranked;
- learning and storing the schema along with a reward measure of the schema's utility;
- selecting a maximum saliency object in the set of objects based on the rank-ordered list of cognitive saliency values.

* * * * *